United States Patent [19]

Wedler et al.

[11] Patent Number: 4,747,480
[45] Date of Patent: May 31, 1988

[54] APPARATUS FOR THE EVEN ALIGNMENT OF OBJECTS UNIFORM AMONG EACH OTHER

[75] Inventors: Klaus Wedler, Mittelbiberach; Winfried Uhl, Mengen-Ennetach, both of Fed. Rep. of Germany

[73] Assignee: Croon+Lucke Maschinenfabrik GmbH+Co. KG, Fed. Rep. of Germany

[21] Appl. No.: 921,354

[22] Filed: Oct. 20, 1986

[30] Foreign Application Priority Data

Oct. 23, 1985 [DE] Fed. Rep. of Germany ....... 3537597

[51] Int. Cl.⁴ .............................................. B65G 47/24
[52] U.S. Cl. .................................... 198/396; 198/415; 198/454; 221/156
[58] Field of Search ............... 198/443, 415, 396, 454, 198/455; 221/156, 171; 414/318, 327

[56] References Cited

U.S. PATENT DOCUMENTS

| | | | |
|---|---|---|---|
| 2,717,703 | 9/1955 | Kull et al. | 414/327 X |
| 2,756,972 | 7/1956 | Stokes et al. | 414/327 X |
| 2,939,182 | 6/1960 | Fleissner | 414/327 |
| 2,970,782 | 2/1961 | Fleissner | 414/327 X |
| 3,776,346 | 12/1973 | Dubuit | 198/396 |

Primary Examiner—Robert J. Spar
Assistant Examiner—Cheryl L. Gastineau
Attorney, Agent, or Firm—Kramer, Brufsky & Cifelli

[57] ABSTRACT

An apparatus for the even alignment of objects essentially uniform among each other comprises at least one conveyor belt moving in a plane in a particular direction, on which the objects are placed. A first and a second conveyor belt, which converge downwards with their conveyor planes to a funnel which randomly receives the objects to be aligned, are provided. In the area of the funnel the first conveyor belt rotates from the bottom toward the top and the second conveyor belt rotates transversely hereto, thus due to the interaction of both conveyor belts the objects are aligned and are subsequently conveyed out of the funnel in this condition by the second conveyor belt.

8 Claims, 1 Drawing Sheet

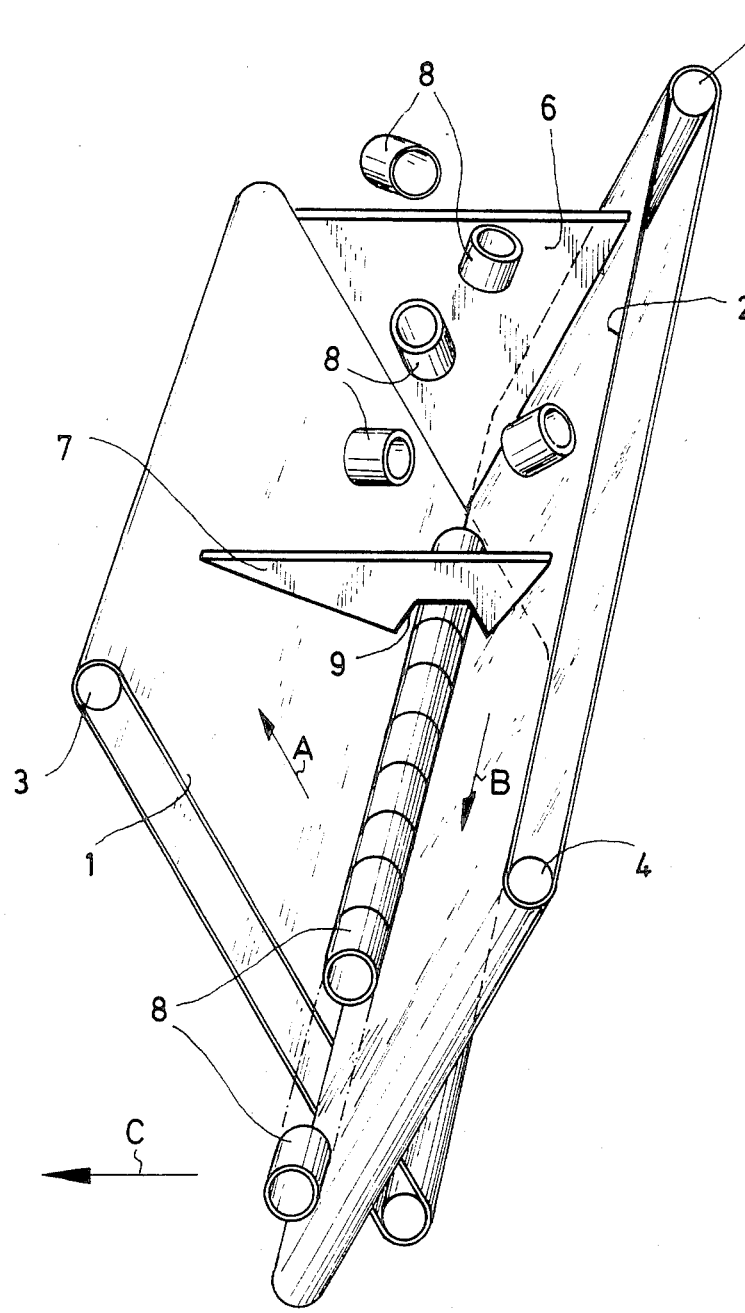

APPARATUS FOR THE EVEN ALIGNMENT OF OBJECTS UNIFORM AMONG EACH OTHER

The invention relates to an apparatus for the even alignment of objects uniform among each other by placing the objects on at least one conveyor belt moving in a plane in a particular direction.

In a known apparatus of this kind, two conveyor belts -proceeding in one and the same conveyor plane are driven in opposite directions. Objects, which on account of their true specific weight rest on both of the conveyor belts, can be aligned along the line of contact of both conveyor belts by the moments of rotation carried out by the belts. This apparatus is only suitable for particular objects and requires considerable time for a perfect alignment, whereby the alignment can moreover only result over relatively small angular areas.

The object of the invention is to improve a generic apparatus in such a way that within a short space of time a, to a large extent, perfect alignment of optional objects is possible, also over large angular areas.

The object is achieved in accordance with the invention in that a first and a second conveyor belt converge downwards with their conveyor planes to a funnel, which randomly receives the objects to be aligned and that in the area of the funnel the first conveyor belt rotates from the bottom toward the top and the second conveyor belt rotates transversely hereto; thus due to the interaction of both conveyor belts, the objects are aligned and are subsequently conveyed out of the funnel in an aligned condition by the second conveyor belt.

The following description of a preferred embodiment serves in conjunction with the appended drawings—in which an embodiment is represented diagramatically in a graphic view—to explain the invention in greater detail.

The alignment apparatus illustrated in the drawing comprises two conveyor belts, namely a first conveyor belt 1 and a second conveyor belt 2. The conveyor belts 1,2 are guided in the usual manner over guide rollers, guide rollers 3, 4 and 5 being visible on the drawing. The propulsion of the conveyor belts 1, 2 results over not-depicted driving motors which engage in each case with a guide roller in such a way that the conveyor-belt (1,2) strands facing one another move ahead in the direction of the arrows A resp. B. The conveyor planes of the conveyor belt are also in each case determined by these strands.

As depicted, the first and second conveyor belt 1 resp. 2 converge downwards with their conveyor planes to a wedge-shaped funnel, which is closed off at its front sides by stationary walls 6,7. The walls 6,7 essentially extend vertically to the conveyor planes. They can extend diagonally relative to one another, preferably diagonally to one another, converging downwards. The two conveyor belts 1,2 are located so closely to one another at the point of convergence of the funnel that objects 8 randomly filled into the funnel for the purpose of alignment, e.g. cylinder sleeves, cannot leave the funnel. The same applies to the walls 6,7 with regard to the distance of their edges from the conveyor belts 1,2.

The conveyor direction A of the first conveyor belt 1 extends from the edge of the funnel from the bottom towards the top. The conveyor direction B of the second conveyor belt 2 extends transversely to the conveyor direction A, preferably vertically hereto, as illustrated in the embodiment of the drawing.

Frictional forces and moments of rotation, which align the objects, thus operate in the area of the funnel on the objects 8 lying on the conveyor belts 1,2 by means of their true specific weight. The alignment results, surprisingly, in such a way that in the direct proximity of the edge of the funnel a row of aligned objects forms, which is gradually pushed out of the funnel in the direction of the arrow B, so that the objects 8 are aligned in the direction of the arrow C—in other words, they can be removed sorted-out and ordered.

If the front wall 7 is provided, this has a discharge point 9 for the aligned objects 8.

As illustrated, the conveyor belt 2 rotating transversely to the conveyor belt 1 is longer than the breadth of the conveyor belt 1, thus the conveyor belt 2 projects over the conveyor belt 1 laterally. Hereby, the aligned objects 8 can easily be removed in arrow direction C in an ordered condition.

The conveyor planes of the conveyor belts 1,2 forming the funnel can converge in an angle between 30° and 120°, preferably between 30° and 60°. This angle, as well as the angle between the conveyor directions A and B of the conveyor belts 1 resp. 2 can easily be suitably varied to match the size, form and weight of the objects to be sorted out.

The same also applies to size and arrangement of the stationary walls 6,7, which can also be dispensed with in the case of a suitably great breadth of the conveyor belt 1 and a suitably great length of the conveyor belt 2. In this case the objects 8 are accumulated in a disordered fashion at the one front side of the funnel. As illustrated in the drawing, a row of aligned objects discharged by the conveyor belt 2 forms, which can be removed from the end of the conveyor belt 2 opposite the accumulation of objects.

It was found that with the specified apparatus, objects 8 can be aligned very quickly and that the apparatus thus has a very high rate of object discharge per time unit. Objects 8 uniform among each other can be most easily aligned with the specified apparatus. The apparatus is, however, also suitable for objects which deviate from one another within certain boundaries in shape, size and weight.

What is claimed is:

1. An apparatus for alignment of essentially uniform, but randomly oriented objects, comprising:
   a first conveyor belt moving along a first plane in a first direction;
   a second conveyor belt disposed adjacent said first conveyor belt for moving along a second plane transverse to the first plane and in a second direction transverse to said first direction and across the width of said first belt; and
   means for aligning the objects disposed between said first and second conveyor belts, said means for aligning including a first stationary wall disposed between the first and second conveyor belts to form a funnel to randomly receive the objects to be aligned, said first stationary wall having a discharge opening through which the objects to be aligned are conveyed out in the second direction.

2. The apparatus of claim 1 wherein the first and second conveyor belts are inclined so that the first and second planes converge at an angle of between 30° to 120°.

3. The apparatus of claim 2 wherein the first and second planes converge at an angle of between 30° to 60°.

4. The apparatus of claim 2 wherein an edge extending the length of said second conveyor belt is disposed adjacent said first conveyor belt to prevent said objects from falling between the first and second conveyor belts.

5. The apparatus of claim 4 wherein said means for aligning further includes a second stationary wall disposed between the first and second conveyor belts to form the funnel to randomly receive the objects to be aligned;

said second stationary wall being disposed closer to the end of said conveyor belt where the objects are received;

said first stationary wall being disposed closer to the end of said second conveyor belt where the objects are aligned.

6. The apparatus of claim 5 wherein said second conveyor belt projects beyond the discharge edge of the first conveyor belt extending along its length whereby the aligned objects can be removed from the ends of the second conveyor belt.

7. The apparatus of claim 6 wherein the first direction and the second direction are at right angles to each other.

8. The apparatus of claim 7 wherein said first direction is outward from the convergence of the first and second planes.

* * * * *